(12) United States Patent
Wheeler

(10) Patent No.: US 9,555,342 B2
(45) Date of Patent: Jan. 31, 2017

(54) THERMAL PROCESSING REACTOR FOR MIXTURES, FABRICATION OF THE REACTOR, PROCESSES USING THE REACTORS AND USES OF THE PRODUCTS OBTAINED

(71) Applicant: ENVIROLLEA INC., Calgary (CA)

(72) Inventor: Lucie B. Wheeler, Calgary (CA)

(73) Assignee: ENVIROLLEA INC., Calgary (CA)

( * ) Notice: Subject to any disclaimer, the term of this patent is extended or adjusted under 35 U.S.C. 154(b) by 877 days.

(21) Appl. No.: 13/679,273

(22) Filed: Nov. 16, 2012

(65) Prior Publication Data

US 2013/0068587 A1 Mar. 21, 2013

Related U.S. Application Data

(63) Continuation of application No. PCT/CA2011/050207, filed on Apr. 18, 2011.

(30) Foreign Application Priority Data

May 18, 2010 (CA) ...................................... 2704186

(51) Int. Cl.
*C10B 1/10* (2006.01)
*B01D 11/02* (2006.01)
(Continued)

(52) U.S. Cl.
CPC ................ *B01D 11/02* (2013.01); *B01J 4/001* (2013.01); *B01J 4/002* (2013.01); *B01J 19/28* (2013.01);
(Continued)

(58) Field of Classification Search
CPC ............ C10B 1/10; C10B 55/00; C10B 55/04; B01J 4/001; B01J 4/002; B01J 19/28
See application file for complete search history.

(56) References Cited

U.S. PATENT DOCUMENTS 1,518,938 A * 12/1924 Nielsen ..................... C10B 1/10
202/118
2,023,942 A 12/1935 Wescott
(Continued)

FOREIGN PATENT DOCUMENTS

CA 1099507 A1 4/1981
CA 1120418 A1 3/1982
(Continued)

OTHER PUBLICATIONS

Fortuna et al., "Pilot-scale experimental pyrolysis plant: Mechanical and operational aspects", Journal of Analytical and Applied Pyrolysis, vols. 40-41 (May 1997), pp. 403-417.

*Primary Examiner* — In Suk Bullock
*Assistant Examiner* — Jonathan Miller
(74) *Attorney, Agent, or Firm* — Bereskin & Parr LLP/S.E.N.C.R.L., s.r.l.

(57) ABSTRACT

A reactor and its internals used for the thermal processing of a mixture. The reactor comprises plates and at least part of the surface of said plates is used to perform said thermal processing. The reactor and its internals are used for the thermal processing of mixtures containing organic compounds. The processes, for thermal processing a mixture comprising organic compounds, comprising the steps of feeding the reactor and its internals and being useful for treating wastes oils and/or for destroying hazardous and/or toxic products; and/or for reusing waste products in an environmentally acceptable form and/or way, and/or for cleaning contaminated soils or beaches, and/or cleaning tar pits, and/or use in coal-oil co-processing, and/or recovering oil from oil spills, and/or PCB free transformed oils. A process for fabricating the reactor and its internals is also proposed.

21 Claims, 13 Drawing Sheets

(51) Int. Cl.
  *B01J 4/00* (2006.01)
  *B01J 19/28* (2006.01)
  *C10B 55/00* (2006.01)
  *C10G 9/00* (2006.01)
  *C10G 9/40* (2006.01)

(52) U.S. Cl.
  CPC ............... *C10B 1/10* (2013.01); *C10B 55/00* (2013.01); *C10G 9/005* (2013.01); *C10G 9/40* (2013.01); *B01J 2204/005* (2013.01); *B01J 2219/0077* (2013.01); *B01J 2219/00085* (2013.01); *B01J 2219/00157* (2013.01); *B01J 2219/00247* (2013.01); *B01J 2219/00768* (2013.01); *B01J 2219/00777* (2013.01); *B01J 2219/187* (2013.01); *C10G 2300/1003* (2013.01); *C10G 2300/1007* (2013.01); *C10G 2300/1033* (2013.01); *C10G 2300/1062* (2013.01); *C10G 2300/308* (2013.01); *C10G 2400/04* (2013.01); *C10G 2400/10* (2013.01); *C10G 2400/18* (2013.01)

(56) References Cited

U.S. PATENT DOCUMENTS

| | | | |
|---|---|---|---|
| 2,785,115 A * | 3/1957 | Borch | C10B 1/10 201/39 |
| 3,807,936 A | 4/1974 | Vering | |
| 4,014,643 A | 3/1977 | Musha et al. | |
| 4,039,130 A | 8/1977 | Hogan | |
| 4,131,418 A | 12/1978 | Kramm et al. | |
| 4,180,455 A | 12/1979 | Taciuk | |
| 4,280,879 A * | 7/1981 | Taciuk | B09C 1/06 201/14 |
| 4,285,773 A * | 8/1981 | Taciuk | C10G 1/02 201/32 |
| 4,411,074 A * | 10/1983 | Daly | F26B 11/028 175/207 |
| 4,439,209 A | 3/1984 | Wilwerding et al. | |
| 4,473,464 A | 9/1984 | Boyer et al. | |
| 4,475,886 A | 10/1984 | Tyler | |
| 4,512,873 A | 4/1985 | Escher et al. | |
| 4,591,362 A * | 5/1986 | Yudovich | C10J 3/06 201/33 |
| 4,746,420 A | 5/1988 | Darian et al. | |
| 4,872,954 A | 10/1989 | Hogan | |
| 4,931,171 A | 6/1990 | Piotter | |
| 4,961,391 A | 10/1990 | Mak et al. | |
| 5,194,069 A | 3/1993 | Someus | |
| 5,316,743 A | 5/1994 | LeBlanc et al. | |
| 5,366,595 A | 11/1994 | Padgett et al. | |
| 5,423,891 A | 6/1995 | Taylor | |
| 5,821,396 A | 10/1998 | Bouziane | |
| 6,203,765 B1 * | 3/2001 | Taciuk | B01J 19/28 196/112 |
| 6,589,417 B2 | 7/2003 | Taciuk et al. | |
| 7,354,462 B2 | 4/2008 | O'Rear | |
| 7,550,063 B2 | 6/2009 | Gawad | |
| 8,298,406 B2 | 10/2012 | Coates et al. | |
| 8,394,240 B2 | 3/2013 | Rinker | |
| 8,999,147 B2 | 4/2015 | Wheeler | |
| 9,089,803 B2 | 7/2015 | Stroeder et al. | |
| 9,200,162 B2 | 12/2015 | Taylor | |
| 2002/0029996 A1 | 3/2002 | Taciuk | |
| 2004/0231237 A1 | 11/2004 | Boer et al. | |
| 2005/0167337 A1 | 8/2005 | Bunger et al. | |
| 2008/0197012 A1 | 8/2008 | Berruti et al. | |
| 2009/0250331 A1 | 10/2009 | Hopkins et al. | |
| 2010/0077711 A1 | 4/2010 | Weigelt et al. | |
| 2010/0293853 A1 | 11/2010 | Feerer et al. | |
| 2010/0294700 A1 | 11/2010 | Coates et al. | |
| 2011/0011719 A1 | 1/2011 | Rinker | |
| 2011/0035998 A1 | 2/2011 | Badger et al. | |
| 2012/0006669 A1 | 1/2012 | Bronshtein et al. | |
| 2012/0055775 A1 | 3/2012 | Manderson et al. | |
| 2012/0318716 A1 | 12/2012 | Wheeler | |
| 2015/0368564 A1 | 12/2015 | Wheeler et al. | |
| 2015/0368567 A1 | 12/2015 | Wheeler | |
| 2016/0053184 A1 | 2/2016 | Wheeler et al. | |

FOREIGN PATENT DOCUMENTS

| | | |
|---|---|---|
| CA | 1129195 A1 | 8/1982 |
| CA | 1221047 A1 | 4/1987 |
| CA | 1316344 C | 4/1993 |
| CA | 1334129 C | 1/1995 |
| CA | 2151792 A1 | 12/1995 |
| CA | 2200525 | 10/1997 |
| CA | 2315774 A1 | 9/1999 |
| CA | 2750129 A1 | 2/2013 |
| EP | 1106672 A1 | 6/2001 |
| GB | 1534302 A | 11/1978 |
| GB | 2150271 A | 6/1985 |
| JP | 2007040615 A | 2/2007 |
| JP | 2008122043 A | 5/2008 |
| WO | 9746843 A1 | 12/1997 |
| WO | 2011143770 A1 | 11/2011 |
| WO | 2012069501 | 5/2012 |

* cited by examiner

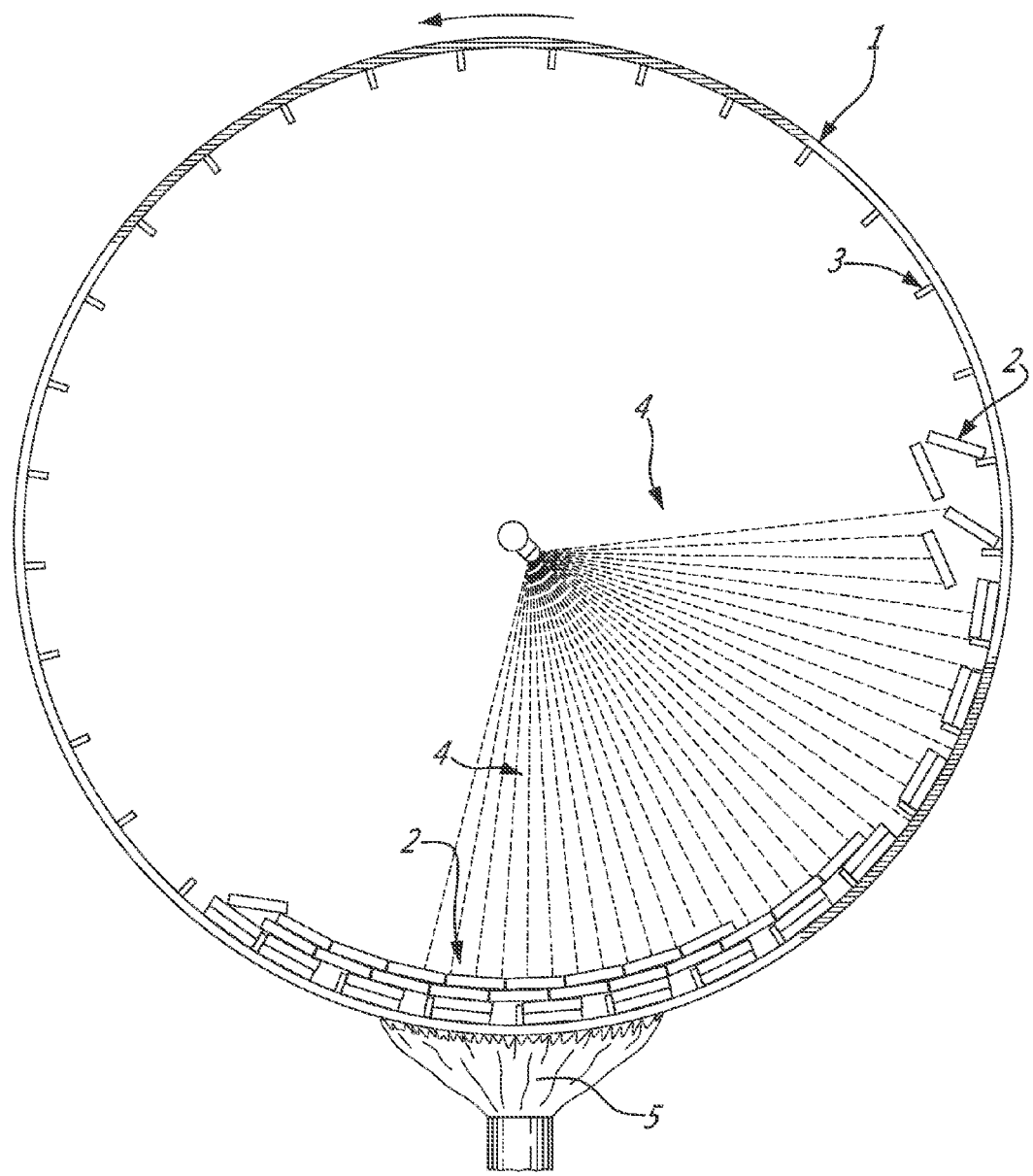

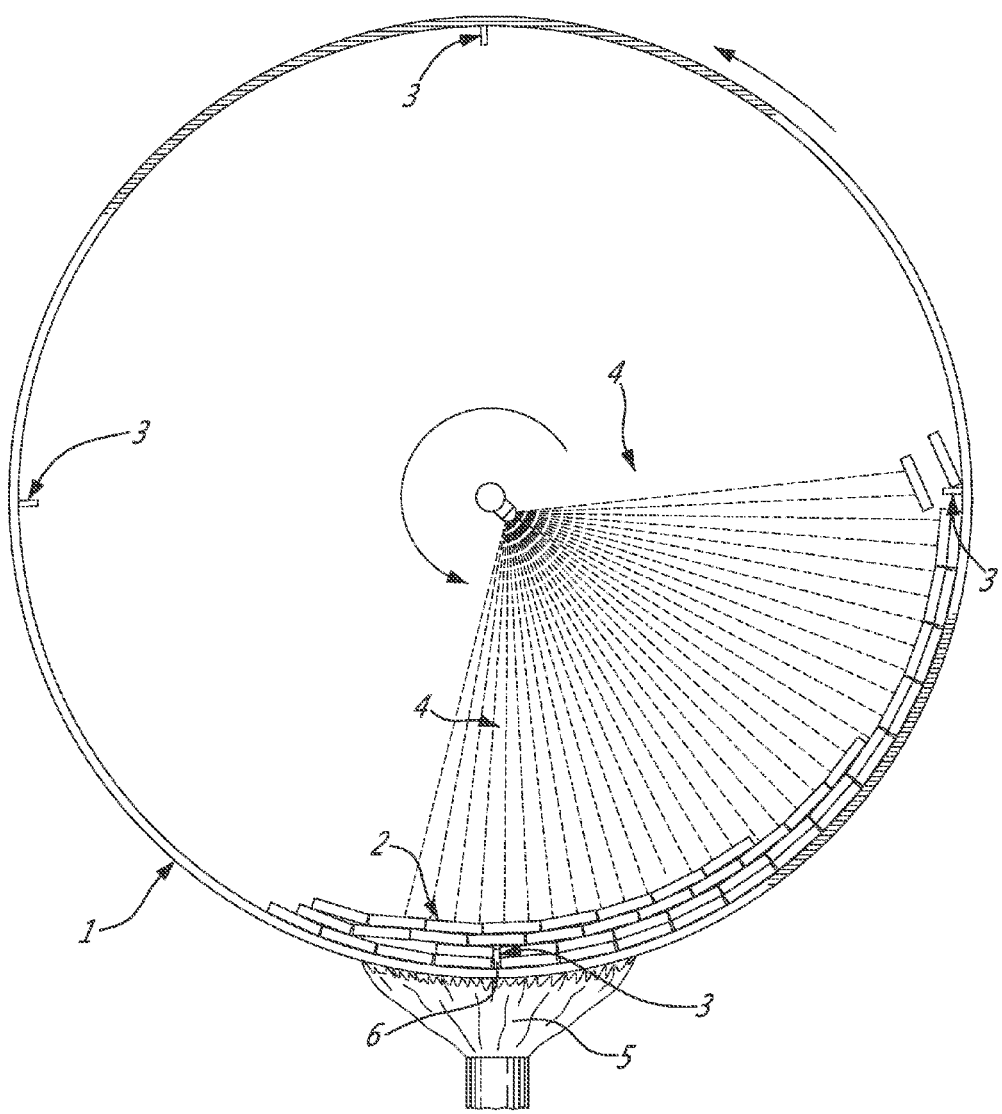

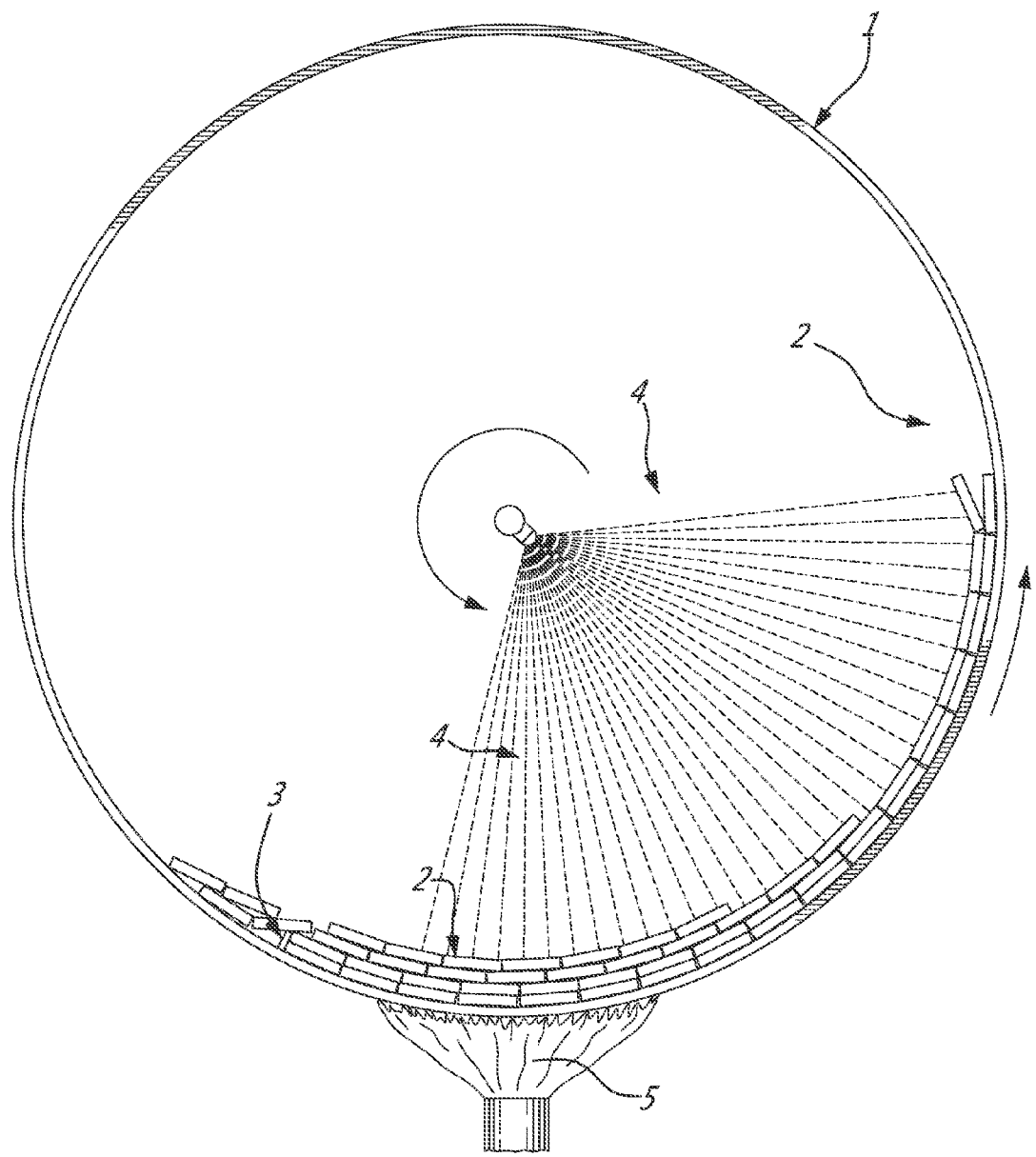

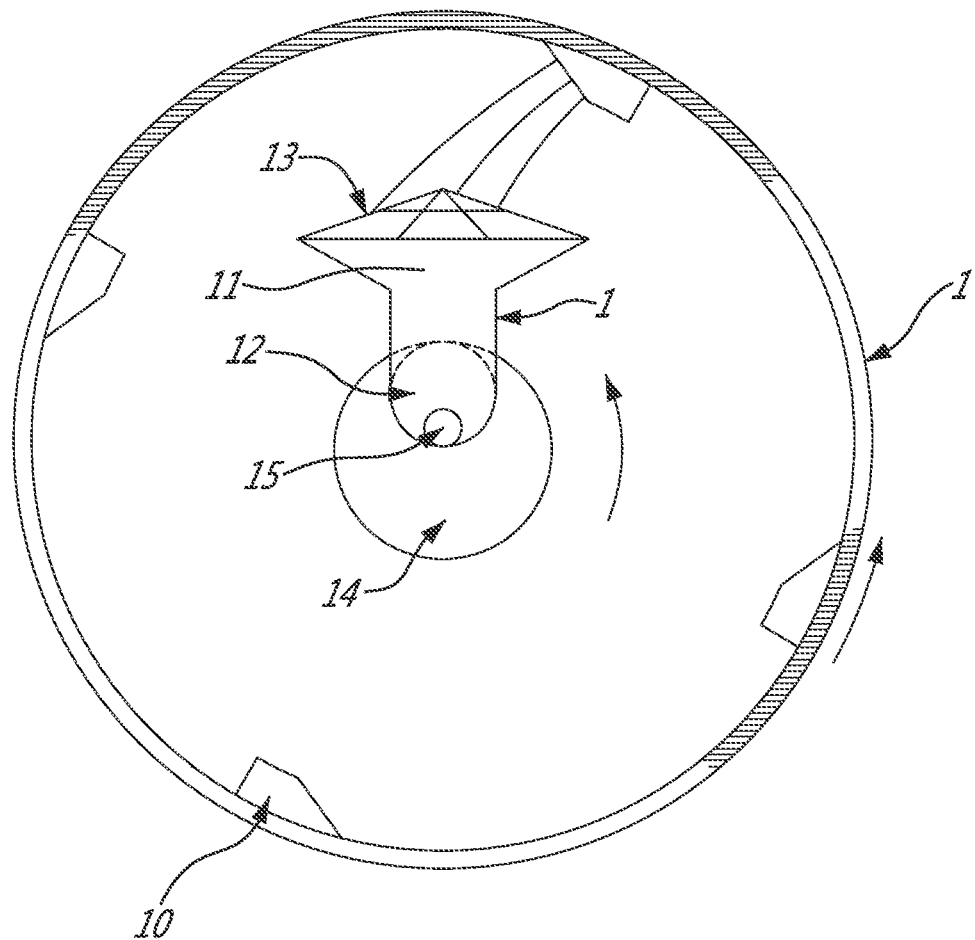

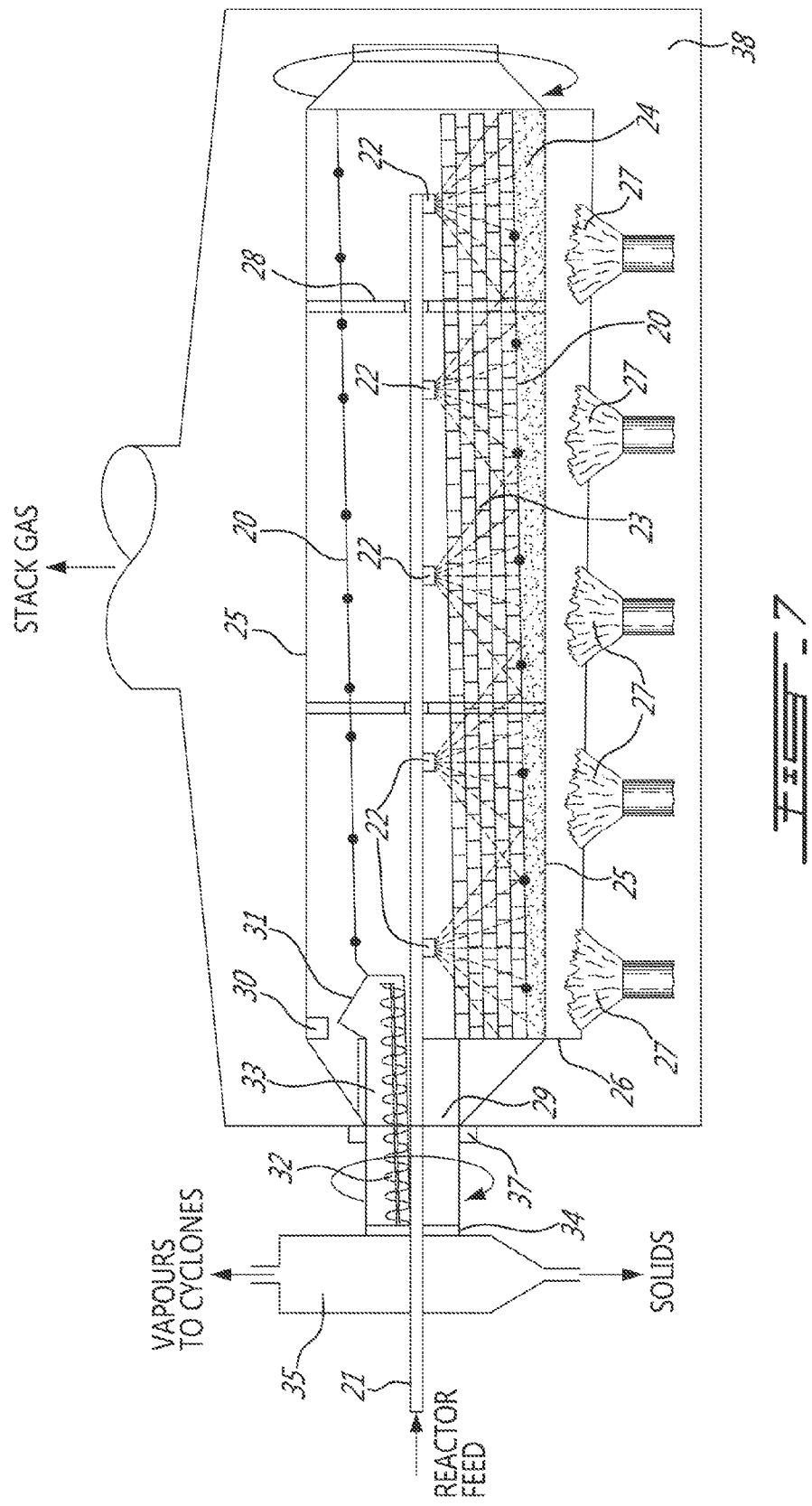

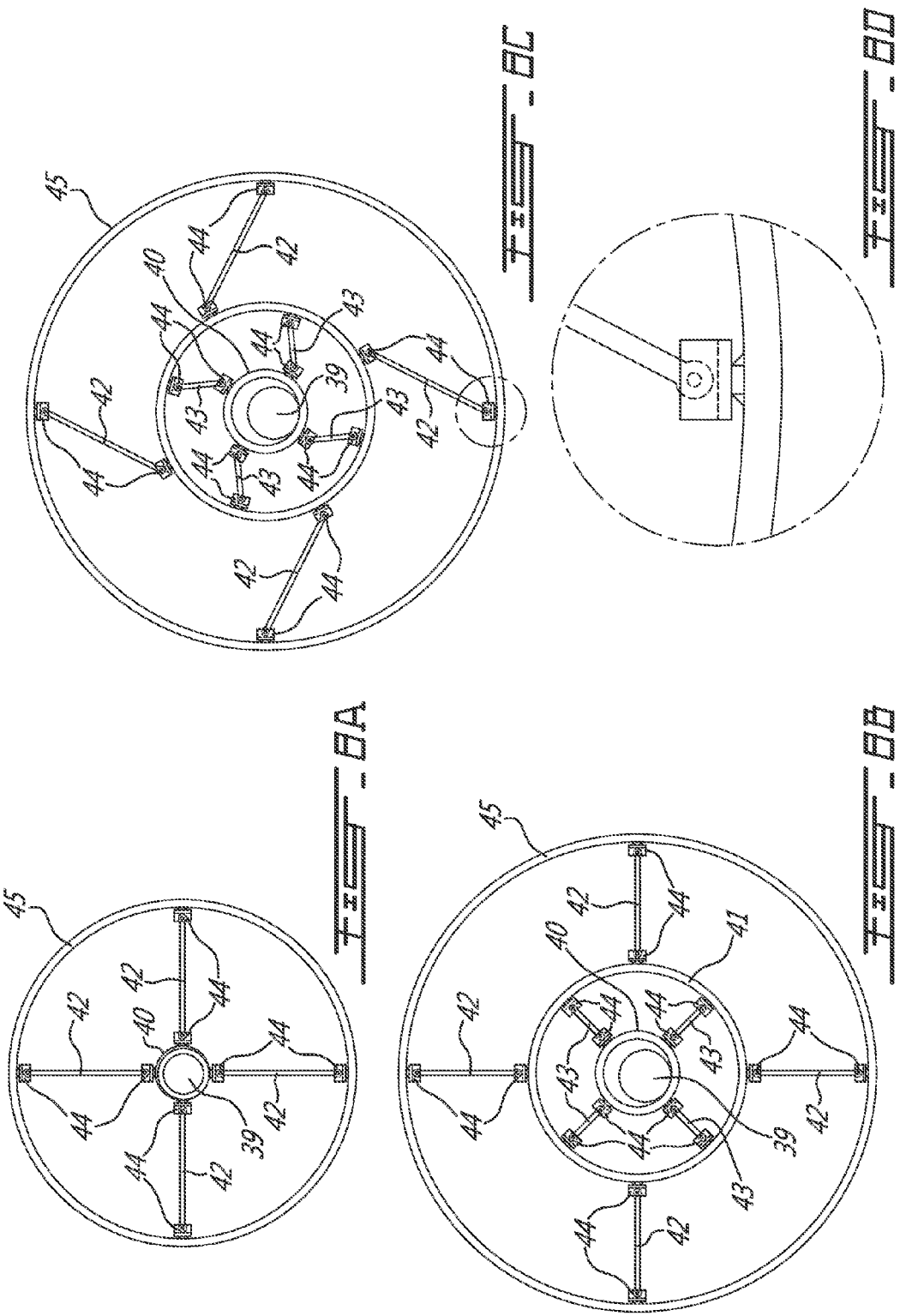

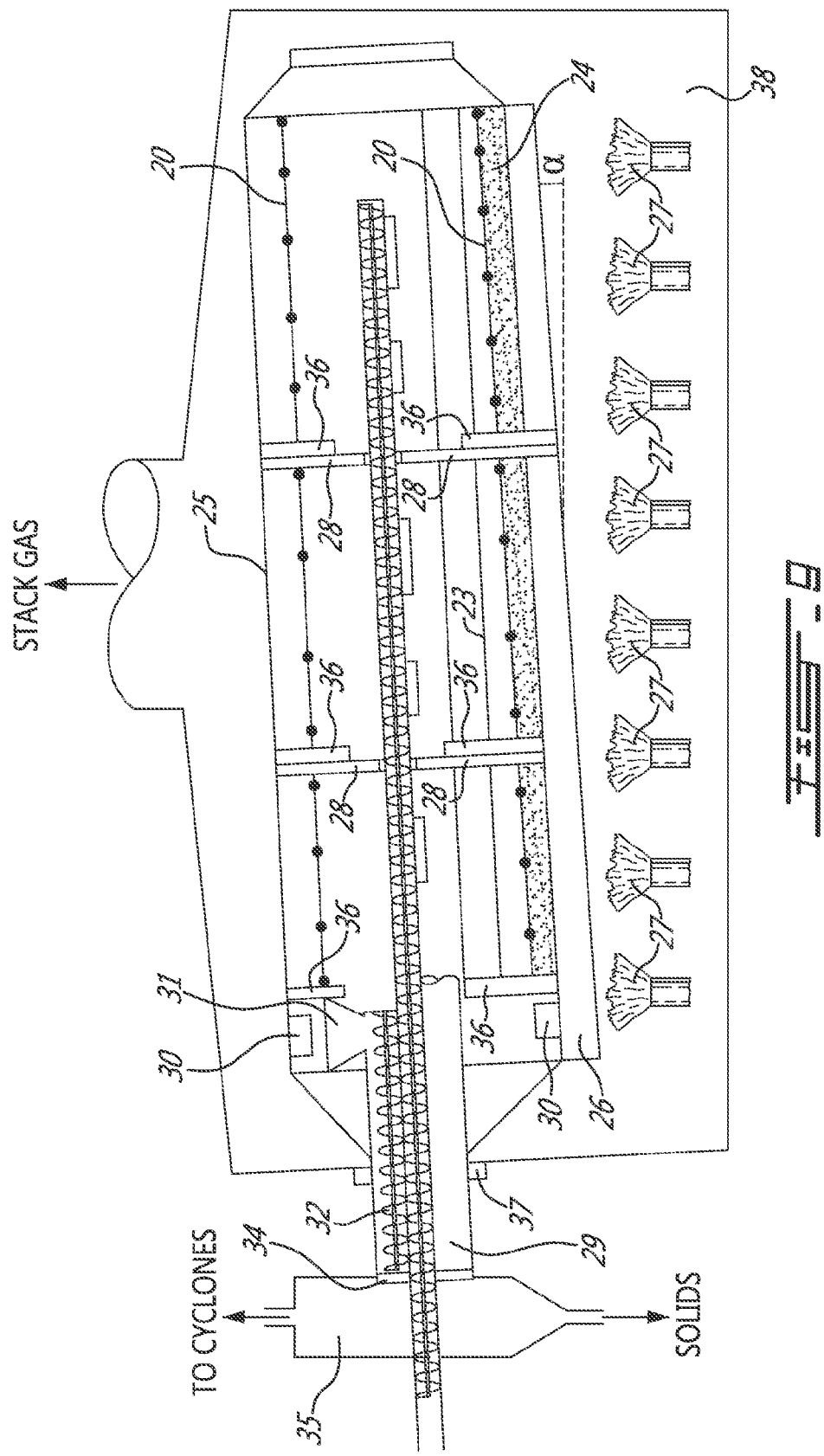

THERMAL PROCESSING REACTOR FOR MIXTURES, FABRICATION OF THE REACTOR, PROCESSES USING THE REACTORS AND USES OF THE PRODUCTS OBTAINED

CROSS-REFERENCE TO RELATED APPLICATIONS

The present application is a continuation of PCT patent application No. PCT/CA2011/050207 filed on 18 Apr. 2011, which claims priority to Canadian Patent Application No. 2,704,186 filed 18 May 2010. The content of these applications is hereby incorporated by reference.

TECHNICAL FIELD

The invention relates to a reactor and its internals for the thermal processing of various mixtures, and more particularly to thermally crack and vaporize used oils, waste oils, heavy oils, or bitumen in a rotating kiln, in the absence of a substantial organic liquid or slurry phase.

The present invention also relates to the use of such reactors for the thermal processing of mixtures such as oils, waste oils, heavy oils, coal, or bitumen in a rotating kiln, in the absence of an organic solid, liquid or slurry phase.

The present invention further relates to processes for thermal processing of a mixture comprising organic compounds, which process comprises the steps of feeding a reactor of the invention and its internals with a mixture to be thermally processed.

The processes for fabricating the reactors of the invention are also part of the invention.

The present invention also relates to the use of the processes of the invention for treating organic mixtures such as waste oils and for preparing inter alia:
- a fuel, or a component in a blended fuel, such as a home heating oil, a low sulphur marine fuel, a diesel engine fuel, a static diesel engine fuel, power generation fuel, farm machinery fuel, off road and on road diesel fuel; and/or
- a cetane index enhancer; and/or
- a drilling mud base oil or component; and/or
- a solvent or component of a solvent; and/or
- a diluent for heavy fuels, bunker or bitumen; and/or
- a light lubricant or component of a lubricating oil; and/or
- a cleaner or a component in oil base cleaners; and/or
- a flotation oil component; and/or
- a wide range diesel; and/or
- a clarified oil; and/or
- a component in asphalt blends.

BACKGROUND

When submitting oils or other hydrocarbons to thermal cracking in a reactor several, major problems occur due to the production of coke during the process. When submitting oils or other hydrocarbons to thermal cracking in an indirectly fired rotating kiln there are also several major problems.

One such problem is keeping the coke, formed in the cracking reactions, from coating the reactor walls and internals thus impeding heat transfer from the heat source to the inside of the kiln. Often charges of sand or metal are added to the kiln to scrape the walls of the kiln as it rotates. Coke rarely deposits in a uniform layer. An uneven coke layer can result in hot spots and eventual failure of the kiln shell.

The second problem is getting the required heat from its source to the reaction site. Typically in a kiln, the heat transfer area in contact with the reactants is a small portion on the kiln shell. Further, charges added to the kiln without being previously heated outside of the kiln will form a resistance to heat transfer.

When the relatively cold oil or hydrocarbon feed is projected directly against the reactor shell, the resulting thermal shock can cause failure of the reactor shell.

In thermal cracking oils, the reaction temperature (and pressure) must be kept in a narrow operating range. If the temperature at the reaction site is too cold, the reaction will take longer and the feed rate will have to be reduced. If the temperature is too high, product quality and quantities are compromised. Therefore, for a given feedstock, reactor size and pressure, the temperature at the reaction site must be closely measured and controlled. This is difficult when the reactor wall cokes up or the metal charge has trapped the coke within it.

Finally, once the coke has been released, either when the reaction takes place or after it has been scraped off the surface it was attached to (i.e. on the charge or on the reactor walls), the coke must exit the reactor without plugging the exit from the reactor thereby causing pressure surges and failure of the reactor seals, often resulting in fires.

Rotating kilns, both directly fired (heat source or flame(s) inside the kiln) and indirectly fired (heat source or flame outside the kiln) have been used in various applications for more than 100 years. When hydrocarbons are being treated in a rotating kiln to make a specific slate of oil products, an indirectly fired kiln is used.

One of the earliest applications for indirectly fired kilns was the production of coal oil and gas by thermal cracking and vaporization of coal.

At present, no satisfying solution has been identified in response to the numerous technical difficulties encountered by the following prior equipment and/or processes.

Holighaus et al. (CA 1,221,047) mentions that to avoid coke deposits building up on the inside of the walls of the drum, the latter contained steel balls that remove deposits from the walls by attrition as the drum revolved. The kiln is slanted toward the exit end, where a stationary box is located. A screen, attached to the kiln, keeps the metal charge in the kiln. The box has two exits, one for the hydrocarbon vapours at the top and a pipe at the bottom of the box for the solids.

Bernt (CA 1,129,195) suggests that chains, attached to spoons, are effective in removing coke deposits from the walls of a rotating kiln.

Musha and Maeda (U.S. Pat. No. 4,014,643) describe a similar apparatus with chains attached to lifters to break down the coke on the kiln walls as the kiln rotates.

Klaus (CA 1,334,129) mentions that the solid pyrolysed coke is removed from the reactor walls by the grinding bodies and the resulting small particles are directed to the centre of the kiln with spiral fins and continuously removed from the reactor through ports in the reactor walls. The ports open into a stationary ring around the kiln. Vapours exit through the top of the ring, while the fine solids exit through the bottom of the ring. Screens keep the grinding bodies in the kiln.

Taciuk et al. (CA 2,186,658) describes a charge of ceramic balls or coarse granular solids provided within the vessel chamber. As the vessel rotates, the ceramic balls or the granular solids scour the vessel's internal surface and comminute the coke into fine solids. The coke is directed to one end of the kiln with spiral fins continuously welded to the reactor wall. A spiral chute with a screen at its entrance transports the coke up to the exit pipe. The exit pipe, at the centre of the exit end of the kiln, has a screw conveyor to take the coke out of the reactor.

These beds of solids constitute a resistance to heat transfer, especially when coke is captive in the interstices between the solids forming the charge.

Indirectly fired rotating kilns are not very efficient in transferring heat to the hydrocarbons to be cracked and/or vaporized through the shell. Some use a stream of solids circulating between two kilns: The process kiln, where the solids release the heat they contain to the hydrocarbon to be treated, and another kiln where the coke that deposited on the solids is burned off, heating the solids, which are then returned to the first kiln.

Taciuk et al., CA 1,120,418, suggest the use of a stream of sand to carry heat from an outer kiln, where the burner is situated, to the inner kiln, where the tar sands is vaporized and/or thermally cracked.

Raymond and McKenny, CA 2,151,792, suggest the use of a stream of ceramic or Pyrex® glass balls circulating between an indirectly fired rotating kiln where a coal and oil mixture are pyrolysed, and a directly fired kiln where the coke is burned off the balls, cleaning and heating them. The hot balls are then returned to the first kiln, where they release some of the heat required for the process.

In a similar process, Taylor, U.S. Pat. No. 5,423,891 mentions a heat carrying solid (HCS) such as iron oxide, aluminium oxide, refractory inert, fine mesh sand, or retorted residue from the starting waste material, circulating between a dryer, where the coke is burned off and the HCS is heated, and the thermal cracking kiln where the "gasification" of solid waste material takes place.

These prior art processes involve significant material handling difficulties encountered in the conveyance of large amounts of hot solids.

Others suggest the use of fins attached to the kiln walls in an effort to enhance heat transfer from the heat source through the reactor walls.

Peterson and Wilson, (CA 1,316,344), describe a plurality of fins extending from the inner wall and transmitting heat from the inner wall to the particulate material.

Kram et al. (U.S. Pat. No. 4,131,418) mention heat exchange fins on the inside of cooling tubes to enhance the cooling of solids particulates.

Hogan (U.S. Pat. No. 4,872,954) mentions fins affixed to the exterior surface of the drum of a retort for treating waste.

Fins continuously welded to the wall of a kiln can cause stress and failure of the kiln wall due to the differential expansions of the wall and of the fins. Also, fins inside the kilns are surfaces that are easily covered in coke causing hot and cool spots furthermore, they are difficult to clean.

Lifters and mixers in rotating kilns are mentioned in several patents, usually to enhance the mixing of material within a directly fired kiln (i.e. the flame is inside the kiln along with the material to be dried, burned, incinerated, calcined and/or decoked).

Tyler (U.S. Pat. No. 4,475,886), Leca (GB 1,534,302), Ellis (GB 2,150,271), Schoof (WO 1997/046843), Hojou (JP 2007 040615), Omiya (JP 2006 0309565) and Doeksen (CA 2315774) all describe lifters or mixers, attached to the kiln wall and protruding trough the ceramic lining of a directly fired kiln. Vering (U.S. Pat. No. 3,807,936) describes blade lifters to be used in kilns treating abrasive materials such as in cement clinkers.

Twyman (CA 1099507) mentions curved lifters, attached to the kiln wall, as mixing paddles in a directly heated kiln with flue gas as the source of heat. In a similar kiln, Musha et al. (U.S. Pat. No. 4,014,643) mentions attaching chains and spoons to the end of each mixing paddle to scrape the kiln walls and the lifter below clean of coke or other deposits in kilns used as dryers for slurries before they are fed to incinerators.

All these mixers and lifters are suggested as means to turn over the material to be treated and show more of the untreated material to the source of heat.

There was therefore a need for reactors allowing the thermal processing of various mixtures but free of at least one of the drawbacks of prior art known reactors and/or processes.

There was a further need for a process that addresses at least one of the problems of the prior art processes, and preferably all of them.

There was a further need for the recovering of valuable products and/or by-products during the process, and preferably for the recovery, in an environmental and acceptable way, of usable products and/or reusable by-products.

There was also a need for new uses for products recovered by thermal treatment.

SUMMARY

A first object of the present invention is to provide a reactor and its internals for thermal processing of a mixture, said reactor comprising:
  a. a rotating kiln;
  b. a heating system;
  c. a least one shelf on the reactor wall;
  d. a charge of plates of consistent shapes;
  e. means for bringing the mixture to be thermally processed on the surface of at least part of the plates;
  f. means for removing the solids from the reactor, preferably either through entrainment with the existing vapours or through a separate solid exit, or both;
  g. means for recovering the reaction and straight run products; and
  h. means for venting the gas, obtained by the thermal processing, outside the reactor zone.

Preferably, those reactors are configured in order to facilitate the thermal processing, more advantageously they are configured in order thermal processing being performed on at least 5%, preferably on at least 10%, of the surface of said plates and/or on at least 5%, preferably on at least 10% of the plates.

Advantageously, the plates, when moving inside said reactor clean the walls of said reactor and/or protect at least part of the walls of said reactor.

The plates contribute to the uniformity of temperatures conditions in said reactor and/or to the heat transfer from the heated walls onto the surface where the reactions take place.

Those reactors of the invention, wherein said plates contribute to the heat transfer taking place from the heated walls to the surface of said plates wherein thermal processing occurs, are of a particular interest.

Those reactors, wherein said plates contribute to avoid spraying of cold mixtures on the heated walls of said reactor, are also of a particular interest.

In those reactors, the at least one shelf is advantageously placed on the reactor wall in such a way to keep a uniform distribution of the plates along the reactor length.

Preferably, the at least one shelf is either parallel to the center axis of the reactor, when the reactor is horizontal, or slanted with respect to the centre axis when the reactor is horizontal, or slanted with respect to the centre axis when the reactor is slanted or not slanted.

Advantageously, said means for bringing the mixture to be thermally processed on the surface of at least part of the plates, bring the said mixture on the surface of at least more than 10% of the plates, preferably on the surface of at least more than 30% of the plates, and more advantageously on the surface of about 50% of the plates present in said reactor.

The reactors and their internals are particularly suited for thermal processing of mixtures that are liquid, gas and/or solid and/or that are mixtures of at least two of these.

The reactors and their internals are also particularly suited for thermal processing of mixtures mostly comprising organic compounds that may be transformed by thermal processing, preferably by pyrolysis. Such mixtures advantageously comprise at least 80% weight, preferably at least 90% weight, and more preferably at least about 95% weight of organic compounds that may be transformed by thermal processing, preferably by pyrolysis.

The reactors of the invention are particularly efficient for treating mixtures of contaminated soils and/or bitumen that preferably comprise up to 71% weight of organic compounds that may be transformed by thermal processing, preferably by pyrolysis; advantageously in the case of oils sands and shale oils, the mixtures have only 7% weight to 12% weight oil, preferably 5 to 11% weight, the remaining being for example sand or earth or shale.

Typically, the mixtures may comprise other components that are not organic compounds and/or that may not be transformed by thermal processing, preferably by pyrolysis.

Those other components may be selected among: water, steam, nitrogen, sand, earths, shales, metals, inorganic salts, inorganic acids, lime, organic gas that won't be transformed in the reactor and among mixtures of at least two of these components.

As a matter of an example, said mixtures are composed of organic compounds that may be transformed by thermal processing in: a liquid phase, a gaseous phase, a solid phase, or in a combination of at least two of these phases.

Said mixtures may also be mostly composed of organic compounds that may be transformed by thermal processing, in at least a liquid phase, a gaseous phase and a solid phase.

The reactors of the invention are particularly suited for the thermal processing of a mixtures selected among the family of the mixtures of used oils, the mixtures of waste oils, marpol, the mixture of heavy oils, the mixtures of bitumen, coal, oil sands, the mixtures of asphalts and the mixtures of at least two of these mixtures.

The reactors may operate in the absence of a substantial organic solid, liquid and of a slurry phase.

Preferably, they may operate in less than 10% vol., preferably in less than 5% vol. of an organic solid, and/or liquid and/or of a slurry phase. More preferably the reactors operate in the absence of an organic solid, liquid and or slurry phase.

Advantageously, the rotating kiln of such a reactor rotates around its centre axis, the said axis is horizontal or slanted. The rotating kiln rotates around its centre axis, the said axis forming with the horizontal an angle that is less than 45 degrees, preferably less than 30 degrees and more preferably this angle is about 5 degrees and more advantageously the angle is of 0 degree. According to a preferred embodiment, said angle is maintained constant except in the case wherein solid agglomeration occurs or when the reactor is cooled down after operation.

According to a further preferred embodiment of the reactors of the invention, their walls are directly and/or indirectly heated.

According to an additional preferred embodiment, the inside of the reactor is directly and/or indirectly heated.

In the reactors of the invention, the heat source is generated by electricity, a hot oil and/or gas stream, or obtained from the combustion of gas, naphtha, other oily streams, coke, coal, or organic waste or by a mixture of at least two of the latters.

Advantageously, the inside of the reactor is indirectly heated by an electromagnetic field and/or is directly heated by a hot gas, liquid or solid stream, electricity or partial combustion of the feedstock, coke, products or by-products. The heating means may comprises at least one heating system external to the walls of the reactor and/or the external walls of the reactor are at least partially surrounded by one or more burners and/or exposed to combustion gas and/or hot solids.

Preferably, the walls of the reactors of the invention are surrounded by a fire box, and said fire box is stationary and heated by one or more burners.

According to another preferred embodiment, one or more shelves are attached to the internal walls or the external walls of said reactors, and advantageously the shelve (s) is (are) are attached to the wall of said reactor in a way allowing for the thermal expansion of the shelves with minimum stress on the reactor wall. The shelve(s) is (are) advantageously held by T shaped clamps and/or the shelve (s) is (are) symmetrically attached to the internal wall of said reactor. Preferably, the shelve(s) is (are) attached to the internal wall in a designed or random pattern of said reactor.

Typically, the number of shelve(s) that is (are) disposed, per square meter of the internal surface of the reactor, on the internal wall of said reactor may range from 1 to 40, preferably from 2 to 20.

Typically, the number of shelve(s) that is (are) disposed, per square meter of the internal surface of the reactor, on the internal wall of said reactor ranges from 1 to 50 units, preferably from 2 to 20 units, more preferably from 3 to 15, and this number is advantageously about 4.

The number of shelves present in the reactor depends on the weight of the plates and/or on the maximum operating temperature of the reactor wall and/or on the material the shelves are made of Typically, the space between two shelves may represent from 0 to 100%, preferably from 5% to 100% of the radius of the cylinder, more preferably represents from 10% to 100% of the radius of the cylinder, this space is more advantageously about 25% of the radius of the reactor that is preferably a cylinder.

The distance between two shelves may represent from 5% to 100%. of the circumference of the inner wall of the reactor that is preferably a cylinder, more preferably represents from 10% to 100%, this space being preferably about 25% of the circumference of the inner wall of the reactor that is preferably a cylinder.

The form of the shelves is selected in the group constituted by flat, concave, convex, spiral and slanted. The shelves present in the reactor may, in some extend, be of different forms.

According to a further preferred embodiment of the invention, the shelves are slanted in relation to the reactor axis, the angle between the reactor axis and the shelves is the same as that between the reactor axis and the horizontal, preferably the angle between the reactor axis and the horizontal can range from 0° to 30° and is more preferably 0°.

Advantageously, the height and/or the width of the shelves is calculated and depends on at least one of the following parameters: the space between the shelves, the space between the supports, the material the shelves are made of and/or the weight of the plates.

Thus, the height and/or the width of the shelves may ranges from 1 to 8 cm, preferably from 1.5 to 4 cm, and said width is more preferably about 2.5 cm.

The width and the height of the shelves are advantageously selected in order for the shelves to be able to retains 2 to 3 plates.

The width of the shelves is advantageously about the thickness of the plates, and is preferably about twice the thickness of the plates.

The height and/or the width of the shelves may range from 1 to 8 times the thickness of the plates for example from 1 to 8 cm for a plate having a average thickness of 1 cm.

The shape of the plates of the charge may be selected among the group of parallelograms, such as square, rectangles, lozenges, or trapezes. The plates of the charge are advantageously of the rectangular, triangular, hexagonal or octagonal types or are a mixture of at least two of the latter type.

Advantageously, the shape of the plates of the charge is perfect or imperfect, or about perfect. Preferably, in a reactor of the invention, all the plates present in the reactor have about the same size and shape.

Those reactors and their internals, wherein the volume of the plates of the charge present in the reactor represents from 1% to 25% of the internal volume of the said reactor, are of a particular interest. This volume of the plates of the charge present in the reactor advantageously represents about 4%, of the internal volume of the said reactor.

Those reactors, wherein the charge of the reactor is constituted by flat and/or slightly curved metal plates of consistent thickness and shape, are also of a particular interest.

The constituting material of the plates may have a melting point which is at least of 100 degrees Celsius, and more preferably is of at least 150 degrees Celsius above the reactor wall temperature in the thermal processing zone. The values of the melting point preferably applies to the maximum temperature of the reactor walls.

It is advantageous that the plates are heavy enough to scrape coke or other solids off the reactor wall and/or off other plates. Thus, each plate may have a density that is preferably superior to 2.0 g/cm$^3$ and more preferably comprised between 5.5 g/cm$^3$ and 9.0 g/cm$^3$.

In such reactors, the means for bringing the mixture in contact with at least part of the surfaces of the plates may be for example spraying means and/or a conveyor.

In such reactors, the means for bringing the mixture in contact with at least part of the surfaces of the plates may be spray nozzles that spray the mixture onto the surface of the plates of the charge.

The means for bringing the solids outside the reactor may be scoop(s), and/or gravity. Advantageously, the means for bringing the solid outside the said reactors comprise an exit hopper arrangement attached to the solids exit tube and/or said reactor has two exits: one for the solids and one for the gas/vapours and entrained solids obtained.

The gas/vapours obtained may contain entrained solids, then said reactors may advantageously be equipped with means for avoiding accumulation of solid in the reactor and/or for plugging of any of the exits. The means for avoiding accumulation are advantageously a screw conveyor in the solids exit tube, or a slanted solids exit tube.

According to further embodiments of the invention, the reactor are a cylinder, or a cylinder with two conic extremities, or two cones attached by their basis, or a sphere. In the case wherein the reactor is a cylinder then the length to radius ratio may range from 1 to 20 and preferably ranges from 2 to 15, more preferably this ratio is about 10.

According to another preferred embodiment of the invention, the reactors comprises at least one feeding line positioned about the longitudinal central axis of the reactor, said feeding line being attached to the internal walls of said reactor by attachment means that allow said feeding line to stay immobile despite the rotational movement of said reactor and/or despite the weight of the feeding line and/or thermal expansion of the feeding line.

Said attachment means may comprise a tube and/or at least a ring surrounding said feeding line, said surrounding tube and/or surrounding ring(s) being attached to the internal wall of the reactor and leaving at least part of the feeding line not surrounded.

The diameter and/of the constituting material of the surrounding tube and/or of the surrounding ring(s) is (are) selected in order to allow the thermal expansion of said feeding line.

According to another embodiment, said attachment means comprise a second tube and/or at least a second ring surrounding said first tube and/or said at least first ring surrounding said feeding line, said second surrounding tube and/or said surrounding ring(s) being attached to the internal wall of the reactor and to the external surface of said first tube and/or of said at least first ring surrounding said feeding line and leaving at least part of the feeding line not surrounded.

Advantageously, the length of the attachment means of the second tube and/or of the at least a second ring is about the distance between the external wall of said the second tube and/or of the at least a second ring to the internal wall of the said reactor.

Preferably, the length of the attachment means of the second tube and/or of the at least a second ring is superior, preferably for at least 10%, more preferably superior for at least 20%, to the distance between the external wall of said the second tube and/or of the at least a second ring to the internal wall of the said reactor.

Advantageously, the length of the attachment means of the said first tube and/or of the said at least first ring to the second tube and/or to the at least a second ring is about the distance between the external wall of said first tube and/or of said at least first ring to the internal wall of the second tube and/or to the at least a second ring.

Preferably, the length of the attachment means of the said first tube and/or of the said at least first ring to the second tube and/or to the at least a second ring is superior, preferably for at least 10%, more preferably for at least 20% to the distance between the external wall of said first tube and/or of said at least first ring to the internal wall of the second tube and/or to the at least a second ring.

Advantageously, some, and preferably each, of the attachment means are articulated to their attachment point.

According to a preferred embodiment, the reactor feed is made laterally trough one end of said reactor, and the exists of the vapours obtained during the thermal processing is positioned on the same end or at the opposite end of said reactor.

According to another preferred embodiment, the reactor feed is made laterally trough one end of said reactor, and the exists of the cokes obtained during the thermal processing is positioned on the same end or at the opposite end of said reactor.

According, to a further preferred embodiment the reactor feed is made laterally trough one end of said reactor, and the exists of the vapours obtained during the thermal processing is positioned on the same end or at the opposite end of said reactor.

Advantageously, rotative kiln suited for the invention have heating means inside allowing the thermal processing to occur on the external walls of the kiln.

The shelves may also advantageously be attached to the exterior surface of the kiln.

Preferably, the external walls of the kiln face the internal wall of the said reactor and/or the feeding of the mixture is on the top of the reactor and preferably is at equal distance of each end of the reactor.

Advantageously, the exit of the vapour may be positioned on a side of the walls of the reactor and preferably at equal distance of both ends of said reactor.

The exit of the coke may also be positioned on a side of the walls of the reactor and preferably at equal distance of both ends of said reactor.

Advantageously, the exit of the solids is on the bottom of the reactor and preferably is at equal distance of each end of the reactor.

A second object of the present invention is the various uses of the reactors and their internals, as defined in the first object of the present invention, for the thermal processing of mixtures of used oils, waste oils, heavy oils, coal, marpol, contaminated soils or sands, or bitumen in a rotating kiln, substantially in the absence of an organic solid, liquid and/or slurry phase.

Of a particular interest are those uses wherein the treated mixtures are of used oils, waste oils, heavy oils, coal, marpol, contaminated soils or sands, or bitumen are introduced in said reactor by means of a conveyor.

According to a preferred embodiment, in the case wherein treated mixtures are contaminated soils or sands, these mixtures are introduced in said reactor by means of belt or screw conveyor.

Advantageously, the uses of the reactors and their internals of to invention are in a continuous process.

A third object of the present invention are the processes for thermal processing a mixture comprising organic compounds, these processes comprises the steps of:
  a) feeding a reactor and its internals as defined in the first object of the invention with said mixture,
  b) heating said reactor and its internals at a temperature corresponding to the thermal processing temperature of part of the mixture; and
  c) recovering of the products resulting from the vaporizing and/or thermal processing and for their elimination from said reactor,
  wherein the mixture to be thermal processed is brought in contact with at least part of the surface of the plates of the charge and result in a reaction and/or vaporization of the feed and products allowing the removal of the mixture in the gas and solids phases, and
  wherein at least part of the plates of the charge moves during the rotation of the reactor.

Advantageously, in step b) of the processes of the invention, said part is the part of said mixture that will be thermal processed in the reactor.

The mixtures may comprise organic compounds, wherein the part of the mixture that will be thermal processed is the heavy part of the mixture and may eventually contain additives commonly used in this technical field and their degradation by-products.

The mixtures that may be treated may comprise organic compounds having the following thermodynamic and physical features: a specific gravity as per ASTM D-4052 between 0.75 and 1.1, and/or distillation temperatures between 20° C. and 950° C. as per ASTM D-1160.

The average residence time in the reactor may range from 5 seconds to 10 hours, and more preferably ranges from 30 seconds to 2 hours, and more preferably from 90 seconds to 10 minutes.

During the processing, the heating temperature in the reactor may range from 350° C. to 750° C., advantageously from 390° C. to 460° C., more preferably from 420° C. and 455° C. and, more advantageously, is about 425° C. Those temperatures are particularly suited when used lube oils are treated.

When contaminated soils or oil sands or soil contaminated with heavy oils are treated, the heating temperature in the reactor ranges from 500° C. to 520° C., an is preferably about 505° C., more preferably about 510° C. particularly when contaminated soils or oil sands or soil contaminated with heavy oils are treated.

The rotation speed of the rotating reactor depends on the size of the reactor and on the process requirements, and may range from 0.5 rpm to 10 rpm. This speed advantageously ranges from 1 rpm to 5 rpm, and is preferably about 3 rpm, for example in the case of a reactor treating 400 barrels of used oil per day.

According to a preferred embodiment of the processes of the invention, the various fractions generated by the thermal processing are recovered as follow:
  the liquid fraction is recovered by distillation
  the gaseous fraction is recovered by distillation; and
  the solid fraction is recovered for example in cyclones, and/or a solids recovery box, and/or a scrubber, and/or a self-refluxing condenser, and/or a dephlegmator.
  Advantageously, in these processes:
  the amount of the recovered liquid fraction represents between 85% and 100% weight of the organic reactor feed; and/or
  the amount of the recovered gaseous fraction represents between 0% weight and 10% weight of the reactor feed; and/or
  the amount of the recovered solid fraction represents between 0% weight and 5% weight, when the feedstock is used lubricating oil.

The processes are advantageously operated in a continuous or in a batch mode.

A fourth object of the present invention is constituted by the uses of a process according to the third object of the present invention for:
  treating wastes oils such as used lubricating oils, form oils, metal treating oils, refinery or transportation oil tank bottoms; and/or
  destroying hazardous and/or toxic products; and/or
  reusing waste products in an environmental acceptable form and/or way; and/or
  cleaning contaminated soils or beaches; and/or
  cleaning tar pit; and/or
  use in coal-oil co-processing; and/or
  recovering oil from oil spills.
  Advantageously, those uses are for preparing:
  a fuel, or a component in a blended fuel, such as a home heating oil, a low sulphur marine fuel, a diesel engine fuel, a static diesel engine fuel, power generation fuel, farm machinery fuel, off road and on road diesel fuel; and/or a cetane index enhancer; and/or a drilling mud base oil or component; and/or a solvent or component of a solvent; and/or a diluent for heavy fuels, bunker or bitumen; and/or a light lubricant or component of a lubricating oil; and/or a cleaner or a component in oil base cleaners; and/or a flotation oil component; and/or a wide range diesel; and/or a clarified oil; and/or a component in asphalt blends.

A sixth object of the present invention is constituted by the processes for fabricating a reactor as defined in the first object of the present invention, which process comprise assembly by known means the constituting elements of said reactor.

The known assembling means may comprise screwing, jointing, riveting and welding.

BRIEF DESCRIPTION OF THE DRAWINGS

FIG. 1: represents a cross section, according to a plan perpendicular to the horizontal axis, of a reactor and the charge of metal plates and the shelves tacked on the kiln walls of a reactor according to a first embodiment of the present invention wherein the reactor cross section has 34 shelves. In this example, the shelves are spaced to allow for only two rows of plates per shelf, one layer against the reactor wall, the other against the first row.

FIG. 2: represents a cross section, according to a plan perpendicular to the horizontal axis, of a reactor and the charge of metal plates and the shelves tacked on the kiln walls of a reactor according to a second embodiment of the present invention wherein the reactor cross section has only 4 shelves, each pushing two layers of enough plates to cover at least a quarter of the reactor wall.

FIG. 3: represents a cross section, according to a plan perpendicular to the horizontal axis, of a reactor and the charge of metal plates and the shelves tacked on the kiln walls of a reactor according to a third embodiment of the present invention, as described in the "Preferred Mode" section of this application, wherein the reactor has only one shelf.

FIG. 6: Illustrates an example of the exit end of the kiln represented in FIG. 1 with 4 scoops.

FIG. 7: is a cross section of a reactor, according to an embodiment of the invention, in the horizontal position and wherein the feeding of the material to be treated and the exit of the vapours and the solids produced are both on the left side of the reactor.

FIG. 8A: is a cross view of a first embodiment of the center ring supports for the feed line inside a cylindrical reactor of the invention, when the reactor is cool.

FIG. 8B: is a cross view of a second embodiment of the center ring supports for the feed line inside a cylindrical reactor of the invention, when the reactor is cool.

FIG. 8C: is a cross view of a third embodiment of the center ring supports for the feed line inside a cylindrical reactor of the invention, when the reactor is heated.

FIG. 8D: is a detailed view of the attachments means of the invention that allows the support beams to expand and rotate at their junctions points with the reactor walls and rings, when the reactor is heated.

FIG. 9: is vertical cross section of reactor according to an embodiment of the invention in a slanted position.

DESCRIPTION OF THE INVENTION

Preliminary Definitions

Figure 5:
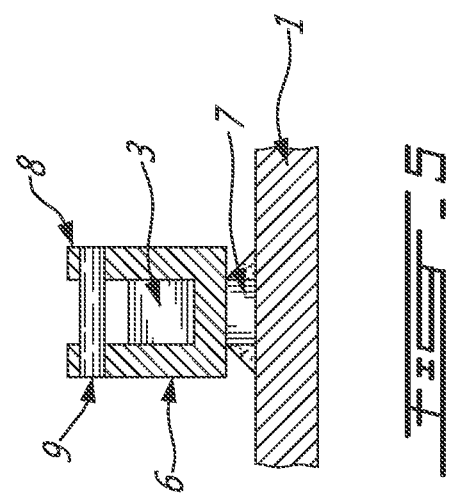
FIG. 5: represents the bracket of FIG. 4 shown from an end.

Consistent shapes: means shapes so they can stay on the narrow shelves and/or each other, while protecting the reactor wall from direct contact with the relatively cold feed.

Thermal processing: is preferably at least one of the followings: evaporating, cracking, drying, pyrolizing and thermocleaning.

The height of a shelve: is the distance between the attachment point of the shelve on the reactor wall and the end of the shelve directed to the center of the reactor.

The width of a shelve: is the measurement of the distance between the two sides of the shelve on a direction perpendicular to the height of the shelve.

Preferred Embodiments of the Invention

The invention is that of the indirectly fired rotating kiln (1), represented on FIGS. 1 and 2, having preferably the following dimensions 8' by 20' containing a charge of 1100 metal plates (2) that are lifted by one or more narrow shelves (3) as the reactor rotates at a speed comprised between 1 and 3 rpm. The shelves are wide enough to hold two plates: one against the wall, and a second one against the first plate. The plates are flat pieces of metal of regular shapes. The heat (5) coming through the reactor wall heats the plates as they are dragged and lifted against the reactor wall by one or more narrow shelves. As the rotation continues, the plates fall off the shelves or off the plates below them, and flip as they fall, presenting the hot surface to the oil jet (4) projected unto the plates (5) by a Nozzle preferably spraying the oil in a rectangular pattern.

The plates carry the heat from the reactor walls and provide a hot surface where the reactions take place. The plates are lifted and kept against the reactor walls by shelves (3). Depending on the thickness of the plates, the shelves can be designed to hold one, two or more rows of plates. As the kiln rotates, the plates fall off the shelves or off the plates below, presenting the face that was against the reactor wall to the oil spray.

As they slide over each other, the metal plates become a surface that protects the reactor walls from direct contact with the relatively cold oil spray and from the resulting thermal shock. Also, as they slide down the reactor, the plates scrape the reactor walls and each other clean of coke and avoid bridging of the depositing coke. The coke released is entrained out of the reactor with the hydrocarbon gas or is removed by the scoops, hopper and solids exit.

Figure 4:
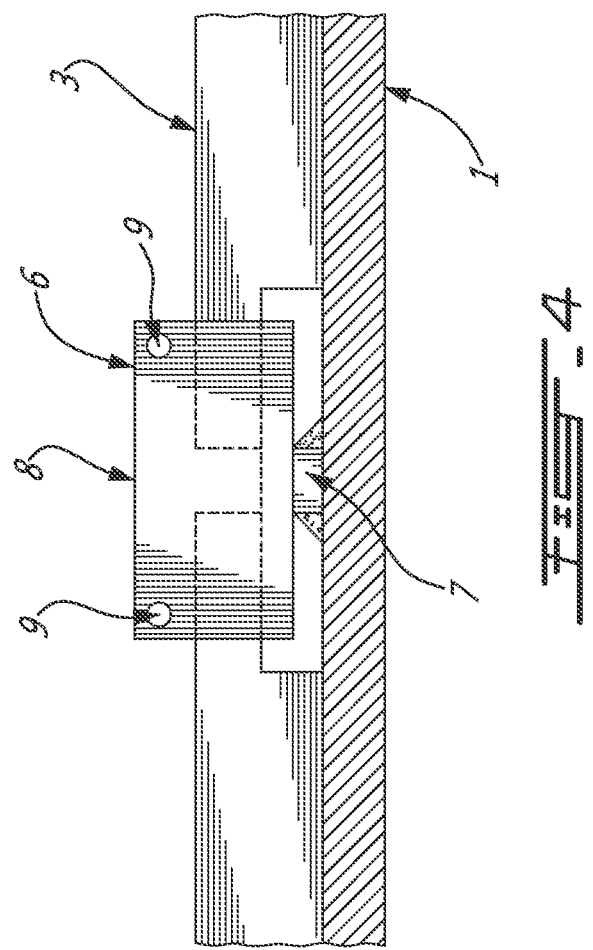
FIG. 4: represents a cross section of a bracket as present in the reactor represented in FIG. 2 with sections of shelves, seen from the top.

The shelves are attached to the reactor walls with clamps (6), represented on FIGS. 4 and 5, to reduce stress due to the differential thermal expansion between the reactor walls and the shelves. The clamps are spaced in such a way that, even at the hottest reactor temperature, the shelves are strong enough to support the hot plates on them. Depending on the spacing between the shelves, there may be only one double row of plates per shelf or several rows one on top of each other. Both the plates and shelves increase the heat transfer area from the heat source to the reaction site.

The clamps (6) are shaped like a T as represented in FIGS. 4 and 5. The base of the T (7) is welded to the rotating kiln walls. The cross bar or top of the T (8) is U shaped to receive the shelve (3) ends, leaving room for the thermal expansion of the shelves, both longitudinally and perpendicular to the reactor wall. Bolts (9) close off the U brackets and keep the shelves from falling out of the brackets. The branches of top of the T (6) are wide enough to allow for the thermal expansion of the shelves within them, while providing strength and support for the load of 1, 2 or more layers of the metal plates along the full length of the shelves in the reactor, and as many rows as the spacing between the shelves will accommodate.

Scoops (10) are attached to the kiln wall at the exit end of the kiln to remove heavier coke that may have deposited on the bottom of the kiln. The scoops are pipe sections with one end closed, and the other end cut on a slant, to allow any hydrocarbon vapours to escape before the coke falls into the hopper (11). The scoops are sized small enough so that the metal plates cannot enter with the coke. As the reactor rotates, the scoops turn upside down and dump their load of coke into a hopper mounted on the solids exit tube (12). To ensure that none of the plates block the coke exit from the reactor, the hopper has a metal grid (13) that will deflect any plate towards the bottom of the kiln. The solids exit tube (12) has a screw conveyor (15) to push the coke out of the reactor. The solids exit tube can be above the vapour exit tube (14), within the vapour exit tube, below the vapour exit, or even at separate ends. There must be at least two exits from the kiln to ensure that the reactor exit is never obstructed. In normal operation, the coke will exit the reactor mostly through the vapour exit (14). The scoops are required when the feed to the kiln is interrupted and there is no vapours to carry the coke out, or when there is a surplus of coke, or the coke is wet or heavy.

The reactor is an indirectly fired rotating kiln, heated by the burner 5, and containing a charge of metal plates that carry the heat from the reactor walls and provide a hot surface where the reactions take place. The plates are lifted and kept against the reactor walls by one or more shelves, wide enough to hold two plates. As the kiln rotates, the plates fall off the shelves, presenting the face that was against the reactor wall to the oil spray. The metal plates protect the reactor walls from thermal shock, and scrape the walls and each other clean of coke. The shelves are attached to the reactor walls with clamps to reduce stress due to differential thermal expansion between the reactor walls and the shelves. Both the plates and shelves increase the heat transfer area from the heat source to the reaction site.

In the test apparatus, used lubricating oils or other oils from a collection depot are sprayed into a horizontal or slanted rotating kiln 10' in diameter and 8' long in order to thermally crack and vaporize the oil or the chemicals within it. The kiln has 4" fins welded in continuous spirals, 8" apart, to the inside of the kiln walls. A 1" wide shelf is attached to the fins, and a charge of 4" equilateral triangular metal plates is added.

As the kiln rotates, the shelf pushes and raises the blades along the reactor wall. As they reach just past the 5' height, they flip as they fall at the top of their run, presenting their hot side to the oil being sprayed on them.

Upon contact with the hot plates, the oil is thermally cracked and/or vaporized. The coke formed is either entrained with the vapours out of the kiln or it deposits on the plates. The plates, sliding against the reactor wall or on each other, scrape the coke free, and it is entrained out of the reactor with the vapours. Most of the coke exits the reactor with the hydrocarbon vapours, the residual coke is removed by the scoops, hopper and solids exit.

Four scoops are welded to the reactor wall at the exit end. They are made from 4" piping, 6" long, with one end plugged, and the other end cut on a slant. A hopper protected by a metal cage above it, receives the coke dumped by the scoops. The cage deflects any scooped up plate back into the reactor. The hopper receives the coke and drops it into the coke exit tube. A screw conveyor, on the bottom of the coke exit tube, carries the coke out of the reactor.

When the reactor feed is used lubricating oil, the recovered gas is 5% weight of the feed and has an average molecular weight of 42, the recovered liquid is 92% weight of the feed and has an average specific gravity of 0.83 and the solids are 3% weight of the feed and have a specific gravity of 1.7. These numbers depend on the feedstock composition, and on the reaction temperatures and pressures.

FIGS. 7, 9, 11 and 12A/12B are illustrations of the apparatus adapted for different feedstocks.

FIG. 7 shows a vertical cross section of a reactor in the horizontal position. The reactor actually has four shelves, but only two are shown here (20). The other two shelves would be on the section not shown. The feed enters the reactor in pipe 21, and is projected unto the hot plates (23) by spray nozzles (22). A possible feed for this reactor would be an organic liquid such as waste oils.

The plates are lifted from the plate bed (24) by the shelves (20). In this illustration, the reactor (25) is supported by two horizontal cylinders (26) and is heated externally with gas or naphtha burners (27). The reactor rotates inside a heating chamber, which is stationary (38). There are various options for the heating chamber. It could be a section of a hot stack, where the stack gas needs to be cooled before clean-up, for example. A seal (37) is shown around the rotating kiln and the stationary wall of the heating chamber. It is useful to keep the feed pipe in place with support rings (28), as illustrated on FIGS. 8A to 8C. The gas and entrained coke leave the reactor through the gas exit pipe (29). Accumulated solid coke is scooped up by shovels (30), is dumped into a hopper (31), and is carried out of the reactor with the help of a screw conveyor (32) inside the solids exit pipe (33). There is a seal (34) between the rotating reactor and the product exit box (35). The product exit box is stationary. A first separation of solids and vapours occurs in the product exit box (35).

FIGS. 8A and 8B are two cases of center ring supports for the feed line (39), shown when the reactor is cool. FIG. 8C is the support rings in FIG. 8B when the reactor is hot. Figure A is for a smaller reactor radius with only one centre ring (40). FIG. 8B is for a larger reactor radius, for which two centre rings (40) and (41) are required to avoid deforming the support legs (42). In FIGS. 8B and C there are two sets of support legs: The first (42) hold the larger centre ring (41) in place. The second set of support legs hold the smaller centre ring (40) in place. The smaller centre ring supports the reactor feed pipe (39). The support legs (42) and (43) are attached to the reactor wall (45) and/or centre rings with brackets (44) that permit and/or allow the support beams to expand and rotate at their junction points with the reactor walls and rings.

FIG. 9 shows a vertical cross section of a reactor in the slanted position, about 5° from the horizontal in this illustration. This reactor would be used for feedstocks that contain solids such as sand. The reactor actually has four shelves, but only two are shown here (20). The other two shelves would be on the section not shown. The feed enters the reactor in pipe 21, it is pushed along the feed line with a screw conveyor and is projected unto the hot plates (23) by nozzles, holes and/or slits (22). The plates (23) are rectangular and are about as long as the reactor section where they are installed. The plates are lifted from the plate bed (24) by the shelves (20). In this illustration, the reactor (25) is supported by two slanted cylinders (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, through the screen (36), and are scooped up by the scoops (30). Accumulated solids are scooped up, along with residual coke, by shovels (30), are dumped into a hopper (31), and are carried out of the reactor with the help of a screw conveyor (32) inside the solids exit pipe (33). There is a seal (34) between the rotating reactor and the product exit box (35). The product exit box is stationary. A first separation of solids and vapours occurs in the product exit box (35).

Figure 10B:
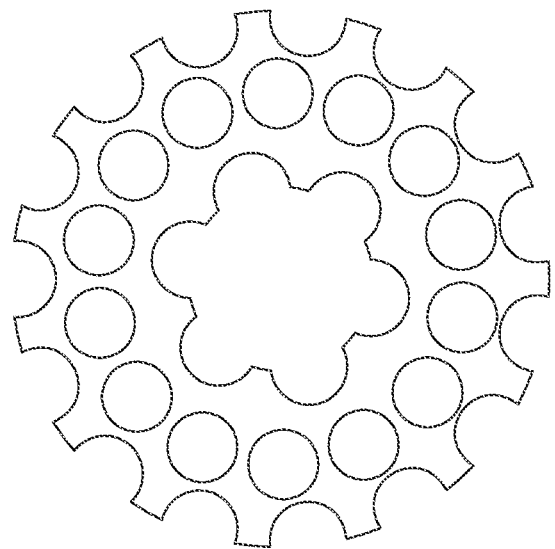
FIG. 10B: is a front view of a screen made of a perforated disc.
Figure 10A:
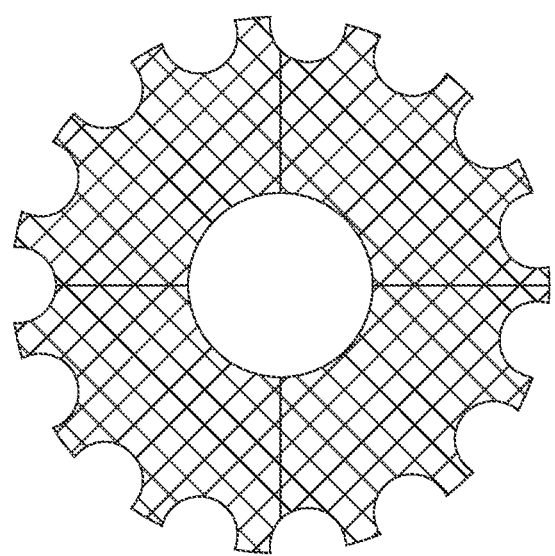
FIG. 10A: is a front view of a screen made of wire mesh.

FIGS. 10A and 10B show two possible configurations for the screens (36) in FIGS. 7 and 9. FIG. 10A is a screen made of wire mesh. FIG. 10B is a screen made of a perforated disc. Both screens are tacked on to the reactor wall. Their outer circumferences are scalloped, allowing for different thermal expansions of the reactor walls and the screens with minimal stress on the reactor walls. Both configurations permit both the vapours and the solids to travel practically unimpeded from one end of the reactor to the other. The perforations are calculated so as to avoid movement of the plates from one section to the other. Also, the perforations must be too small for the ends of the plates to enter. The screens will be scraped clean by the plates, as the reactor turns.

Figure 11:
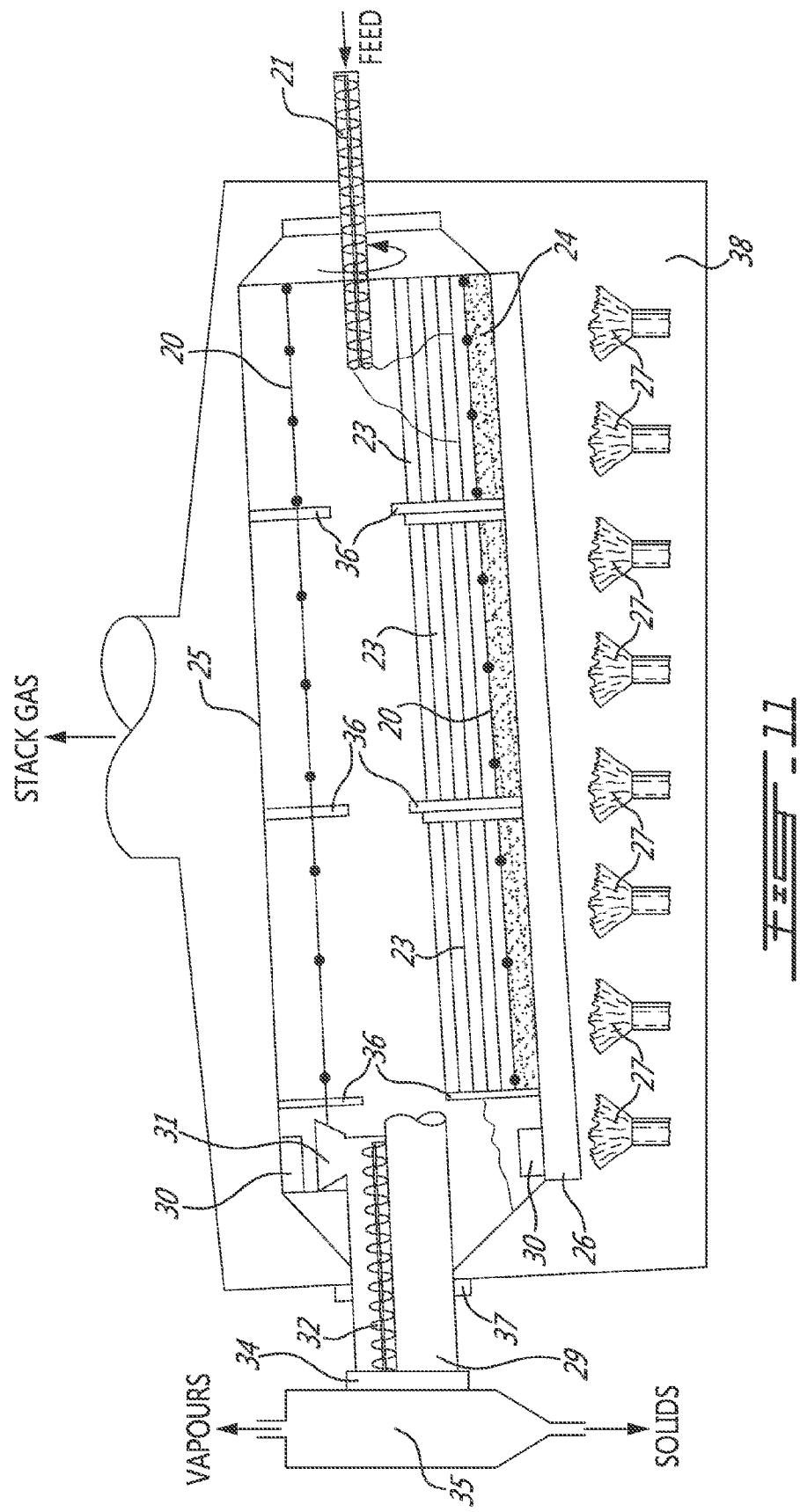
FIG. 11: is a vertical cross section of a reactor according to an embodiment of the invention in a slanted position wherein the feeding of the material to be treated and the exit of the thereby obtained vapours and solids are on opposite side of the reactor.
Figure 12:
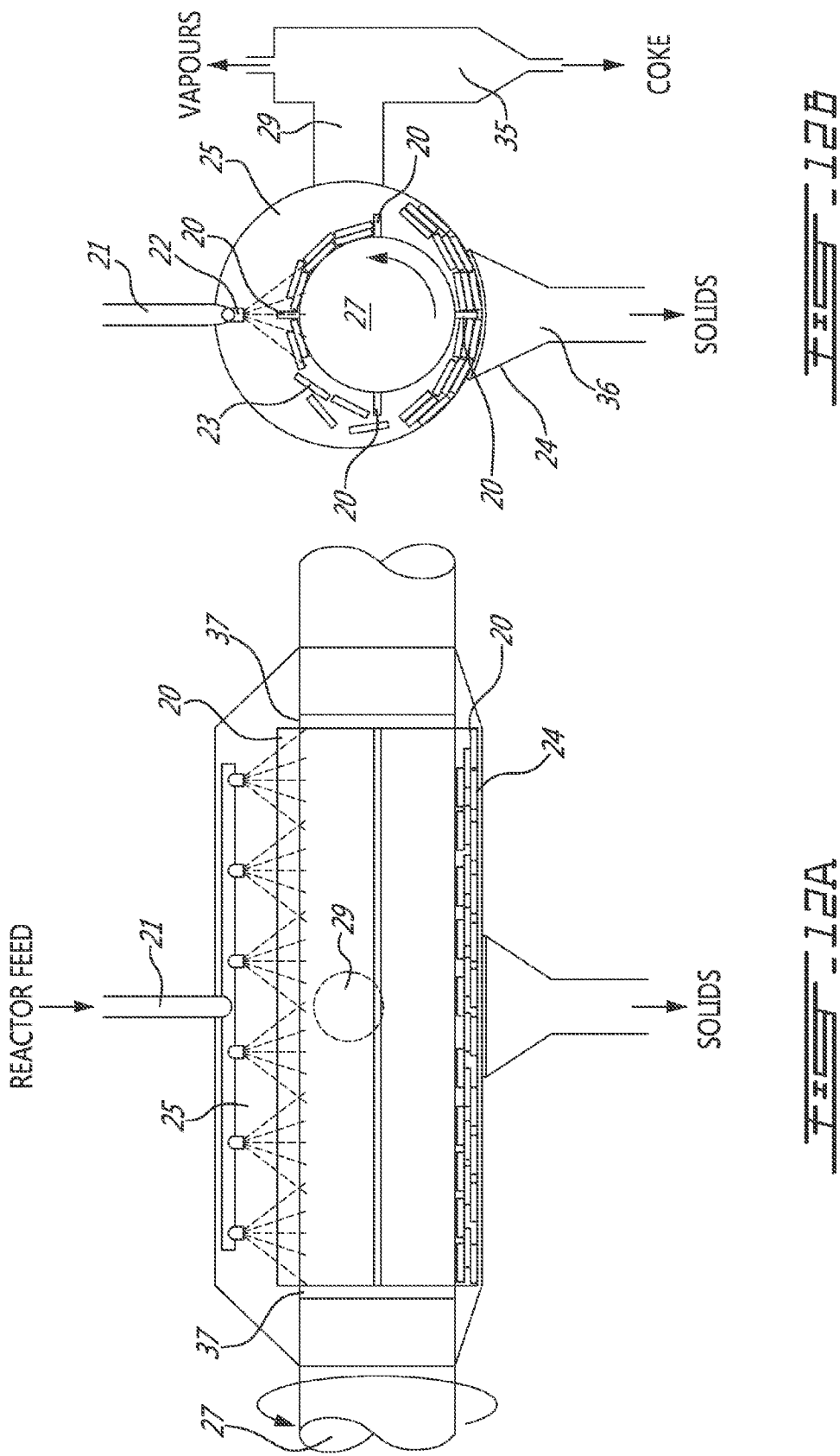
FIGS. 12A and 12B: are a further alternate embodiment of the rotating reactor of the invention wherein heating is performed inside the reactor.

FIG. 11 is a vertical cross section of a reactor in the slanted position, about 5° from the horizontal is illustrated here.

This reactor would be used for feedstocks that contain solids such as sand.

The reactor actually has four shelves, but only two are shown here (20). The other two shelves would be on the section not shown. The feed enters the reactor in pipe 21, it is pushed along the feed line with a screw conveyor and is projected unto the hot plates (23) through the end of the pipe or slits in the pipe (22).

The plates (23) are rectangular and are about as long as the reactor section where they are installed when the reactor is heated. The plates are lifted from the plate bed (24) by the shelves (20). In this illustration, the reactor (25) is supported by two slanted cylinders (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, through the screens (36), and are scooped up by the scoops (30). Accumulated solids are scooped up, along with residual coke, by shovels (30), are dumped into a hopper (31), and are carried out of the reactor with the help of a screw conveyor (32) inside the solids exit pipe (33). There is a seal (34) between the rotating reactor and the product exit box (35).

The product exit box is stationary. A first separation of solids and vapours occurs in the product exit box (35).

Figure 13:
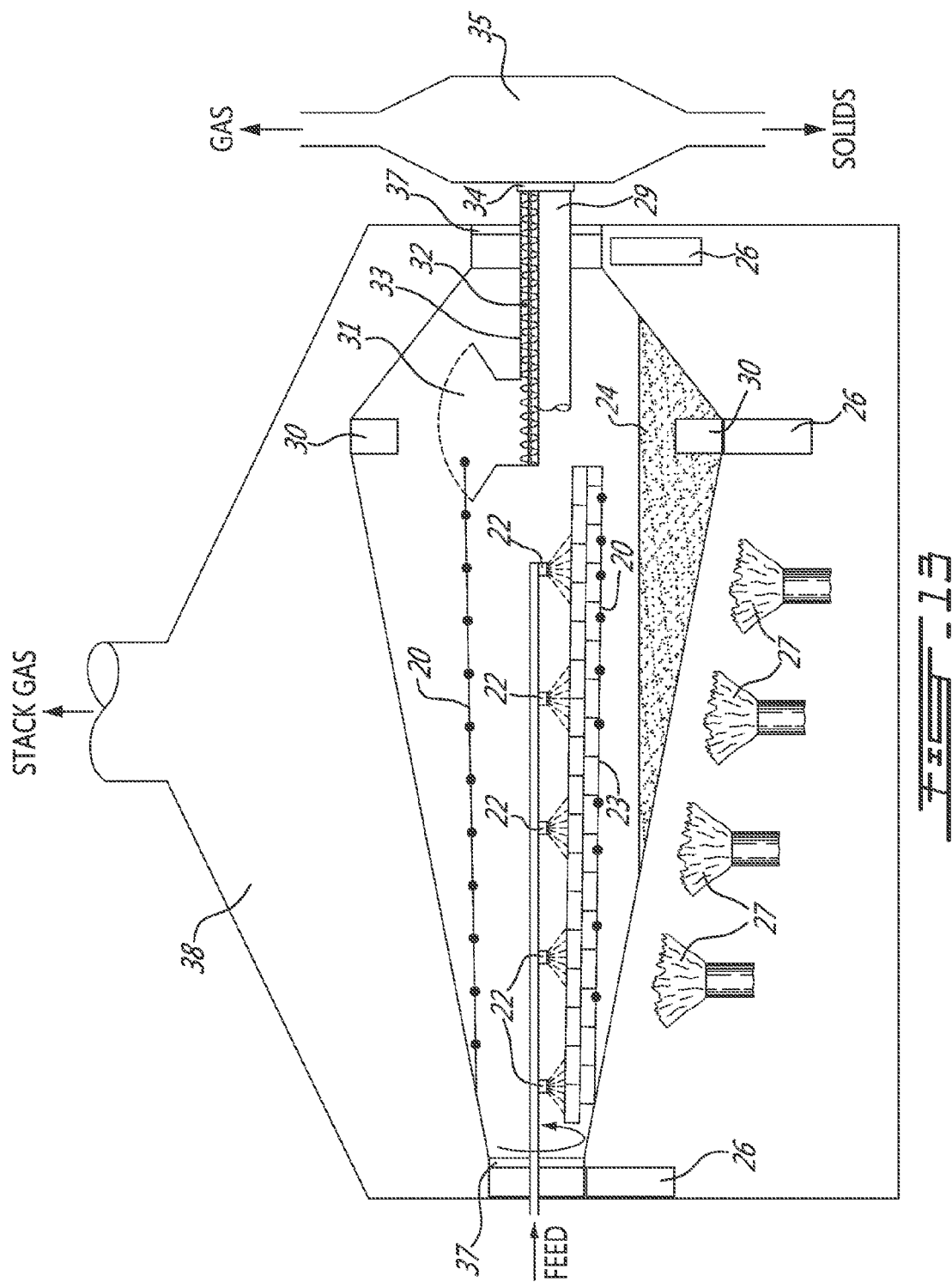
FIG. 13: is a vertical cross section of a reactor of the invention made up of two cones joined at the base.

FIG. 13 shows a vertical cross section of a reactor made up of two cones joined at the base.

This reactor could be used for liquid feedstocks and/or feedstocks that contain solids such as sand. The reactor actually has four shelves, but only two are shown here (20). The other two shelves would be on the section not shown. The feed enters the reactor in pipe 21, and is projected unto the hot plates (23) through the end of the pipe or spray nozzles (22).

The plates (23) are rectangular and are about as long as the reactor section where they are installed when the reactor is heated. The plates are lifted from the plate bed (24) by the shelves (20). In this illustration, the reactor (25) is supported by two truncated cones and a cylinder (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, and are scooped up by the scoops (30). Accumulated solids are scooped up, along with residual coke, by shovels (30), are dumped into a hopper (31), and are carried out of the reactor with the help of a screw conveyor (32) inside the solids exit pipe (33).

There is a seal (34) between the rotating reactor and the product exit box (35). The product exit box is stationary. A first separation of solids and vapours occurs in the product exit box (35). This shape of reactor allows the plates to slide back towards the entrance and scrape the walls, other plates and the shelves clean of coke and other deposited solids.

Figure 14:
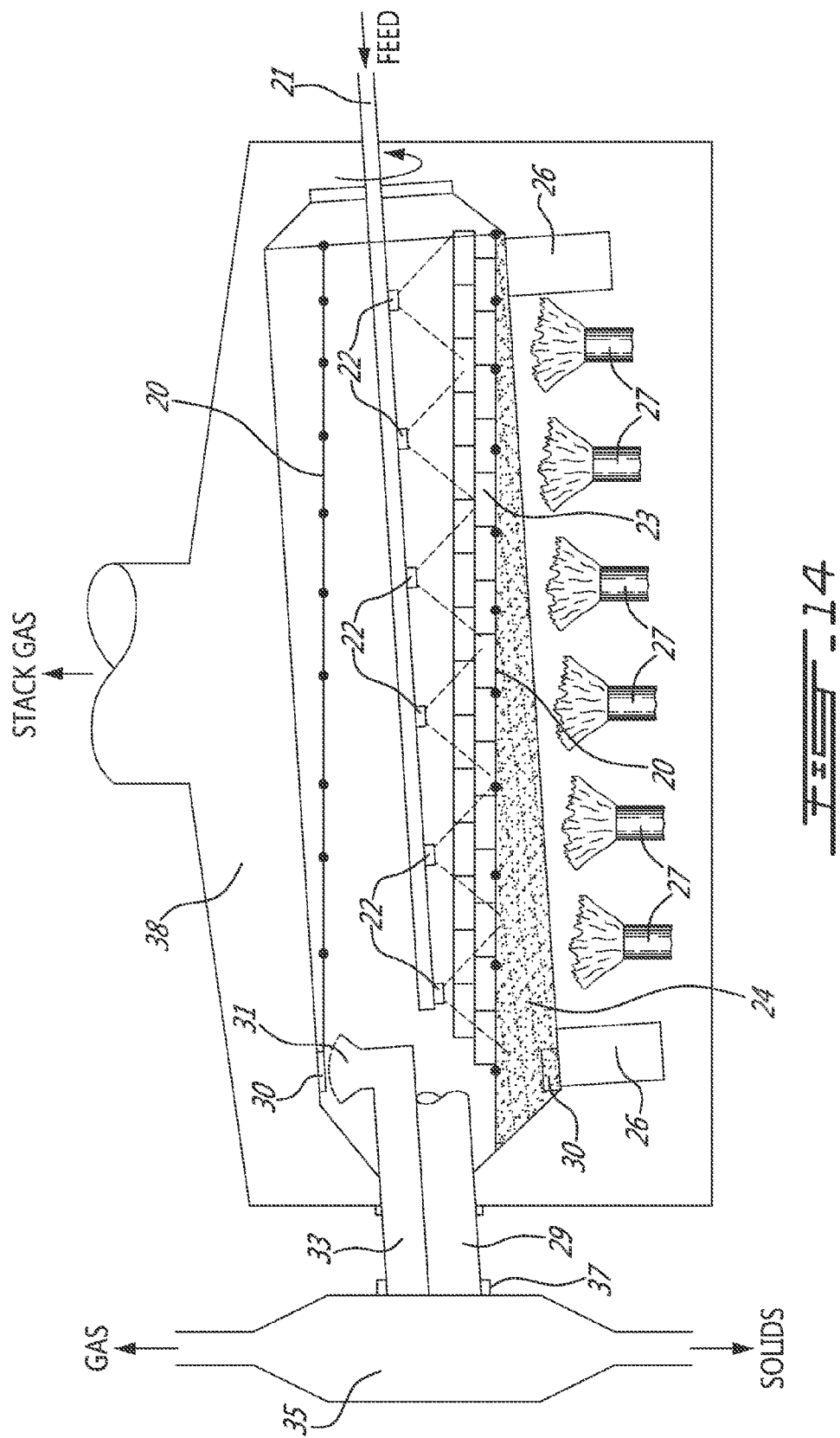
FIG. 14: is a vertical cross section of a reactor of the invention in a slanted position with a configuration particularly suited for treating heavy oils feedstocks that may produce more solids or more cokes or contain sand or contaminated soils.

FIG. 14 represents a vertical cross section of a reactor in the slanted position, about 5° from the horizontal is illustrated here. This reactor would be used for heavy oils feedstocks that may produce more coke or contain sand or contaminated soils.

The reactor actually has four shelves, but only two are shown here (20). The other two shelves would be on the section not shown. The feed enters the reactor in pipe 21, it is either pumped or pushed along the feed line with a screw conveyor and is projected unto the hot plates (23) through spray nozzles or slits in the pipe (22). The plates (23) are rectangular and they not only flip when falling off the shelves, but also slide along the shelves, scraping coke off the shelves and reactor walls.

The plates are lifted from the plate bed (24) by the shelves (20). In this illustration, the reactor (25) is supported by two slanted rollers (26) and is heated externally with gas or naphtha burners (27).

The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, and are scooped up by the scoops (30). Accumulated solids are scooped up, along with residual coke, by shovels (30), are dumped into a hopper (31), and slide out of the reactor through the slanted solids exit pipe (33). There is a seal (34) between the rotating reactor and the product exit box (35). The product exit box is stationary. A first separation of solids and vapours occurs in the product exit box (35).

ADVANTAGES OF THE INVENTION

In order to understand the advantages of the invention, it may be useful to explain why the invention was necessary and how it progressed.

In the kiln above, at first, the oil was sprayed on a charge of ceramic balls. For the reaction to occur, the kiln had to be over heated because the charge impeded heat transfer to the reaction sites.

Furthermore, the ceramic balls were too smooth and light to scrape the coke off the reactor walls. The balls exploded into dust because of the thermal shock between the cold oil and the hot reactor wall. The reactor had to be shut down to remove the coke and ceramic dust that caked the reactor wall and bottom. The reactor runs were less than a day long.

The solids charge was changed to a number of coarse granulated solids charges. They were more effective in scraping the coke off the reactor walls but soon the coke stayed trapped within the charge, again impeding the heat transfer to the reactor sites. The temperature at the reaction site varied as the coke built up within the charge. The run times increased to 3 to 4 days before the reactor had to be shut-down.

The solids charge was replaced by off-spec cultivator blades: equilateral triangles, with 6" sides, made of carbon steel. The blades were effective in keeping the reactor walls clean but the temperature in the reactor continued to vary. A shelf was attached to the reactor wall and the reaction temperature became steady and easier to control, allowing for a specific slate of products of consistent qualities. The reactor walls stayed free of coke and run times increased to 6 weeks or more.

Thermal cracking is an endothermic reaction. Since the oil spray was directed to the hot metals plates, the coke deposited on the metal plates instead of the reactor walls. The blades not only removed the coke that formed on the reactor wall, they protected the reactor wall from coke depositing there in the first place. The shelf pushed the metal plates higher and longer against the reactor wall. The reaction surface area and its temperature could be increased without over firing the kiln.

There was a conveyor to transport the coke from the bottom of the reactor to the exit tube. The conveyor was enclosed, protecting the coke and hydrocarbon vapours from the heat source. This caused the coke to be wetted by the condensing oil, and to agglomerate. This apparatus resulted in the formation of coke-oil plugs that obstructed the exit tube and cause over pressuring of the reactor. The enclosed conveyor was replaced with scoops, open to the kiln heat, dumping dry coke into the new coke exit tube. The coke exit tube was separated from the vapour exit to avoid re-entrainment of the fines into the product vapours or plugging of the only exit from the reactor and over-pressurizing the reactor.

In summary some of the advantages of the new thermal processing apparatus include:
A steady and controllable reaction temperature,
A specified product slate of consistent quality,
Protection of the reactor wall from stress and failure due to thermal shock or hot spots,
Preventing coke from depositing and sticking on the reactor walls and internals,
Longer run times, shorter shut-downs, less maintenance cost,
Safer operation,
A steady and controllable reaction pressure, and
Minimizing of the thermal stress on the reactor walls and/or on the internals.

Some embodiments of the invention may have only one of these advantages, some embodiments may several advantages and may have all of simultaneously.

Although the present invention has been described with the aid of specific embodiments, it should be understood that several variations and modifications may be grafted onto said embodiments and that the present invention encompasses such modifications, usages or adaptations of the present invention that will become known or conventional within the field of activity to which the present invention pertains, and which may be applied to the essential elements mentioned above.

What is claimed is:

1. A reactor and internals of said reactor for thermal processing of a mixture, said reactor comprising:
   a. a rotating kiln;
   b. a heating system;
   c. at least one shelf on a wall of the rotating kiln, the at least one shelf being either parallel to a center axis of the rotating kiln, when the rotating kiln is horizontal, or slanted with respect to the center axis when the rotating kiln is slanted or not slanted;
   d. a charge of plates of consistent shapes, at least a portion of said plates being held by said at least one shelf against said reactor wall so as to heat a surface of said plates for a time until rotation of said kiln causes said plates to flip and fall so as to present said heated surface of said plates to said mixture to be thermally processed;
   e. means for bringing the mixture to be thermally processed on the surface of at least part of the plates;
   f. means for removing the solids, produced in the reactor during the thermal processing, from the rotating kiln;
   g. means for recovering reaction and straight run products produced in the reactor during the thermal processing; and
   h. means for venting gas, obtained by the thermal processing, outside the zone defined by the rotating kiln, wherein the height of the shelves is about twice the thickness of the plates.

2. The reactor and internals of said reactor, according to claim 1, for thermal processing of a mixture, wherein thermal processing is performed on at least part of the surface of said plates in movement.

3. The reactor and internals of said reactor, according to claim 1, for thermal processing of a mixture, wherein said plates are configured to clean the wall of said reactor when moving inside said reactor.

4. The reactor and internals of said reactor, according to claim 1, for thermal processing of a mixture, wherein said plates are configured for protecting at least part of the wall of said reactor.

5. The reactor and internals of said reactor, according to claim 1, for thermal processing of a mixture, wherein said plates are configured for contributing to uniformity of temperature conditions in said reactor.

6. The reactor and internals of said reactor for thermal processing of a mixture, according to claim 1, wherein the at least one shelf is positioned on the reactor wall to keep a uniform distribution of the plates along the reactor length.

7. The reactor and internals of said reactor for thermal processing of a mixture, according to claim 1, wherein the mixture is liquid, gas and/or solid and/or is a mixture of at least two of these.

8. The reactor and internals of said reactor for thermal processing according to claim 1, wherein the shelve(s) is (are) are attached to the wall of said reactor with attachment means allowing for the thermal expansion of the shelves with minimum stress on the reactor wall and the shelve(s).

9. The reactor and internals of said reactor for thermal processing according to claim 1, wherein the reactor comprises several shelves and the number of shelves in the reactor depends on weight of the plates and/or on maximum operating temperature of the reactor wall and/or on material the shelves and plates are made of.

10. The reactor and internals of said reactor for thermal processing according to claim 1, wherein the form of the shelve(s) is selected from the group consisting of: flat, concave, convex, spiral and slanted.

11. The reactor and internals of said reactor for thermal processing according to claim 1, wherein the height and/or the width of the shelve(s) is calculated and depends on at least one of the following parameters: space between the shelves, space between supports, material the shelves are made of and weight of the plates.

12. The reactor and internals of said reactor for thermal processing according to claim 1, wherein the shape of the plates of the charge is a parallelogram.

13. The reactor and internals of said reactor for thermal processing according to claim 1, wherein the shape of the plates of the charge is perfect or imperfect, or about perfect.

14. The reactor and internals of said reactor for thermal processing according to claim 1, wherein all the plates present in the reactor have about the same size and shape.

15. The reactor and internals of said reactor for thermal processing according to claim 1, wherein the volume of the plates of the charge present in the reactor represents from 1% to 25% of the internal volume of the said reactor.

16. The reactor and internals of said reactor for thermal processing according to claim 1, wherein the plates are heavy enough to scrape coke or other solids off the reactor wall and/or off other plates.

17. The reactor and internals of said reactor for thermal processing according to claim 1, wherein the reactor is a cylinder, or a cylinder with two conic extremities, or two cones attached by their basis, or a sphere.

18. The reactor and internals of said reactor, according to claim 1, for thermal processing, wherein the means for bringing the mixture to be thermally processed on the surface of at least part of the plates of the rotating kiln is a feeding line positioned about the longitudinal center axis of the reactor, said feeding line being attached to the internal surfaces of the wall of said reactor by attachment means.

19. The reactor and internals of said reactor according to claim 1, wherein means for removing the solids from the rotating kiln are means for removing the solids either through entrainment with the existing vapours or through a separate solid exit, or through both.

20. The reactor and internals of said reactor for thermal processing according to claim 11, wherein the height and/or the width of the shelve(s) is calculated and depends on at least one of the following parameters: the space between the shelves, and the space between the supports of the shelves that are of a "T" brackets type.

21. The reactor and internals of said reactor for thermal processing according to claim 12, wherein the shape of the plates of the charge is selected from the group consisting of: square, rectangles, lozenges, and trapezes.

* * * * *